(12) United States Patent  
Jenks

(10) Patent No.: US 6,412,314 B1
(45) Date of Patent: Jul. 2, 2002

(54) TRAILER HITCH LOCK MODULE

(76) Inventor: Bruce Jenks, 772 Newton Way, Costa Mesa, CA (US) 92627

( * ) Notice: Subject to any disclaimer, the term of this patent is extended or adjusted under 35 U.S.C. 154(b) by 0 days.

(21) Appl. No.: 09/784,458

(22) Filed: Feb. 15, 2001

(51) Int. Cl.$^7$ .................................................. B60D 1/06
(52) U.S. Cl. ............................ 70/14; 70/232; 70/258; 280/507; 280/512
(58) Field of Search .................................. 70/14, 58, 62, 70/229, 230, 232, 163, 164, 258, 234, 235; 280/507, 511–513

(56) References Cited

U.S. PATENT DOCUMENTS

| | | | | |
|---|---|---|---|---|
| 1,810,592 A | * | 6/1931 | Billstein | 280/512 |
| 2,571,349 A | | 10/1951 | Eckles | 280/33.17 |
| 3,391,555 A | | 7/1968 | Mamo | 70/258 |
| 3,605,457 A | | 9/1971 | Foster | 70/14 |
| 3,779,653 A | * | 12/1973 | Charlton | 280/512 X |
| 3,792,432 A | * | 2/1974 | Ellis et al. | 280/507 X |
| 3,820,823 A | * | 6/1974 | Beaston | 70/258 X |
| 3,884,055 A | | 5/1975 | Vuillemot | 70/58 |
| 3,977,221 A | | 8/1976 | Foote | 70/58 |
| 4,141,569 A | | 2/1979 | Dilk | 280/507 |
| 4,291,893 A | * | 9/1981 | Hansen | 280/507 |
| 4,459,832 A | * | 7/1984 | Avrea et al. | 70/14 |
| 4,466,259 A | * | 8/1984 | Osgood, Sr. | 70/19 X |
| 4,538,827 A | | 9/1985 | Plifka | 280/507 |
| 4,768,358 A | | 9/1988 | Viola et al. | 70/14 |
| 5,312,128 A | * | 5/1994 | Blacklaw | 280/512 |
| 5,433,468 A | * | 7/1995 | Dixon | 280/507 |
| 5,513,871 A | | 5/1996 | Johnson | 280/507 |
| 5,700,024 A | * | 12/1997 | Upchurch | 280/507 |
| 6,164,681 A | * | 12/2000 | Grammer | 280/508 |
| 6,199,890 B1 | * | 3/2001 | Lindenman et al. | 280/504 X |
| 6,315,315 B1 | * | 11/2001 | Seale | 280/507 |

FOREIGN PATENT DOCUMENTS

| | | | | |
|---|---|---|---|---|
| DE | 3502701 A1 | | 7/1986 | |
| FR | 2611622 | | 9/1988 | |
| GB | 992133 | * | 5/1965 | 280/507 |
| GB | 1206333 | * | 9/1970 | 70/14 |
| GB | 2132956 | | 7/1984 | 280/507 |
| SE | 164457 | * | 8/1958 | 280/512 |

* cited by examiner

Primary Examiner—Llyod A. Gall
(74) Attorney, Agent, or Firm—Walter A. Hackler

(57) ABSTRACT

A trailer hitch module for engaging a trailer tongue socket includes a base and a ball fixed to the base for engaging a socket cup. A locking arm is provided and pivotally attached to the base so that it is movable in a plane parallel to the base between a close position engaging a protruding lip of the socket in order to prevent removal of the socket from the ball and an open position away from the lip in order to enable removal of socket from the ball. A lock mechanism is provided for securing the locking arm in the closed position.

9 Claims, 2 Drawing Sheets

TRAILER HITCH LOCK MODULE

The present invention generally relates to lock apparatus and is more particularly directed to a trailer hitch lock module which can be easily used to prevent unauthorized towing of a trailer or theft of a trailer hitch to a towing vehicle.

A great number of trailers utilize ball-type hitches which include a socket for receiving a ball. Because of the commonality of the ball hitch coupling, numerous vehicles are equipped with a trailer hitch ball which are capable of being connected to an unattended trailer.

To prevent theft, trailer owners have utilized a great number of devices such as padlocks and chains for attaching the trailer to an adjacent post, fence or other fixed object. Unfortunately, chains are easily severed with bolt cutter or the like which defeats the security of the trailer.

The same issue occurs when the trailer is attached to the vehicle. A link chain, or cable and padlock are commonly used for locking a trailer to a vehicle. This security system is also easily defeated by a forcing a lock or breaking the chains in order to remove the trailer from the vehicle.

Accordingly there is a need for a trailer hitch lock module which can be easily attached and removed to the trailer hitch coupler, thus providing ease of mind for the owner and at the same time enable the owner to quickly attach and remove the locking apparatus so that his own use of the trailer is not significantly inhibited by the use of the safety device. In addition, the module in accordance with the present invention, can be used in many applications on the vehicle itself for preventing unauthorized separation of the vehicle and the trailer.

SUMMARY OF THE INVENTION

A trailer hitch lock module in accordance with the present invention generally includes a base and a ball fixed to the base for engaging a socket cup of a trailer tongue. A locking arm is provided and pivotally attached to the base which is movable in a plane parallel to the base between a closed position, engaging a protruding lip of the trailer tongue socket in order prevent removal of the socket from the ball, and an open position away from the lip in order to enable removal of the socket from the ball. A lock mechanism is provided for securing the locking arm in the closed position.

More particularly the lock mechanism includes means adjusting the closed position for the locking arm in order to accommodate different size socket lips. Preferably the locking mechanism includes a cylinder lock disposed on the locking arm for pivoting therewith.

The means for adjusting the close position of the locking arm comprises a plurality of spaced apart holes in the base and the cylinder lock includes a moveable pin for engaging one of the holes.

To provide more secure engagement between a locking arm and the socket lip, the locking arm preferably includes an arcuate portion, or cutout, for partially surrounding the socket and engaging the lip in the closed position.

BRIEF DESCRIPTION OF THE DRAWINGS

The features and advantages of the present invention will be more clearly understood with reference to the following detailed description when taken in conjunction with the accompanying drawings, in which.

DETAILED DESCRIPTION

Figure 1:
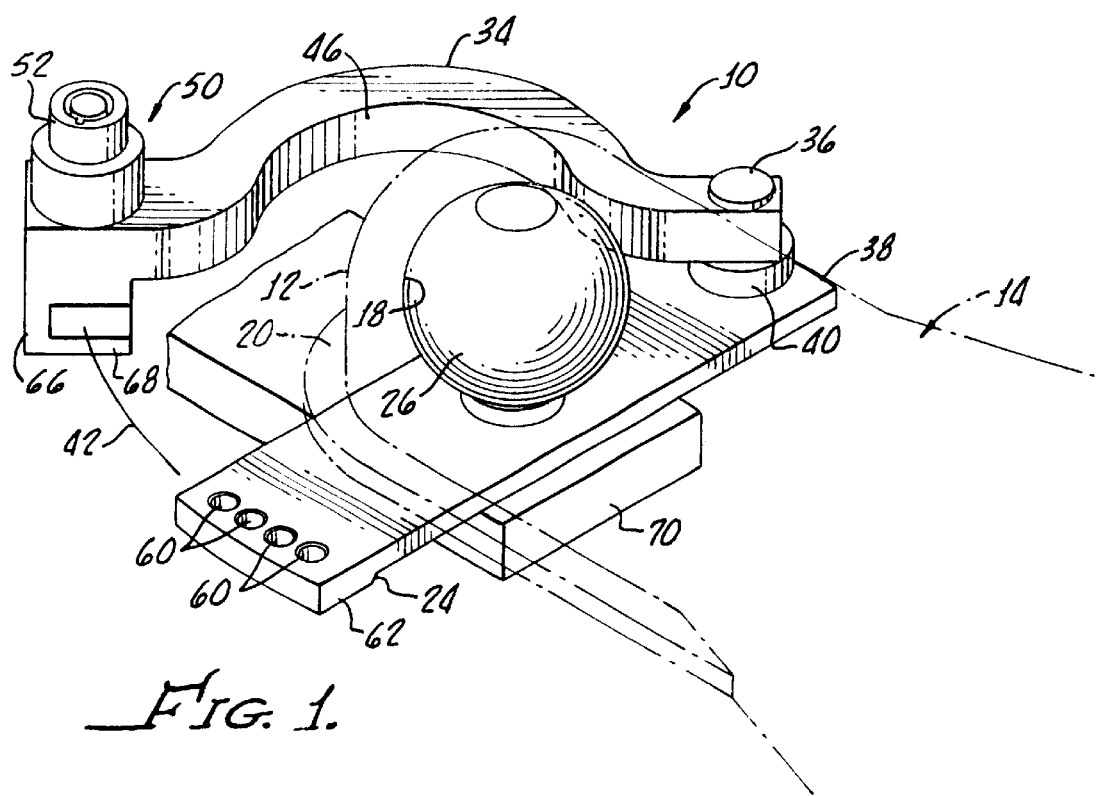
FIG. 1 is a perspective view of a trailer hitch lock module in accordance with the present invention generally showing a ball, base and locking arm pivoted to an opened position for removal of a trailer tongue and socket from the module.

With reference to FIG. 1 there is shown a trailer hitch lock module 10 for engaging a socket 12 in a trailer tongue 14. The socket 12 includes a cup 18, more clearly shown in FIGS. 2–4, and a protruding lip 20, more clearly shown in FIGS. 1, 3 and 4.

Figure 3:
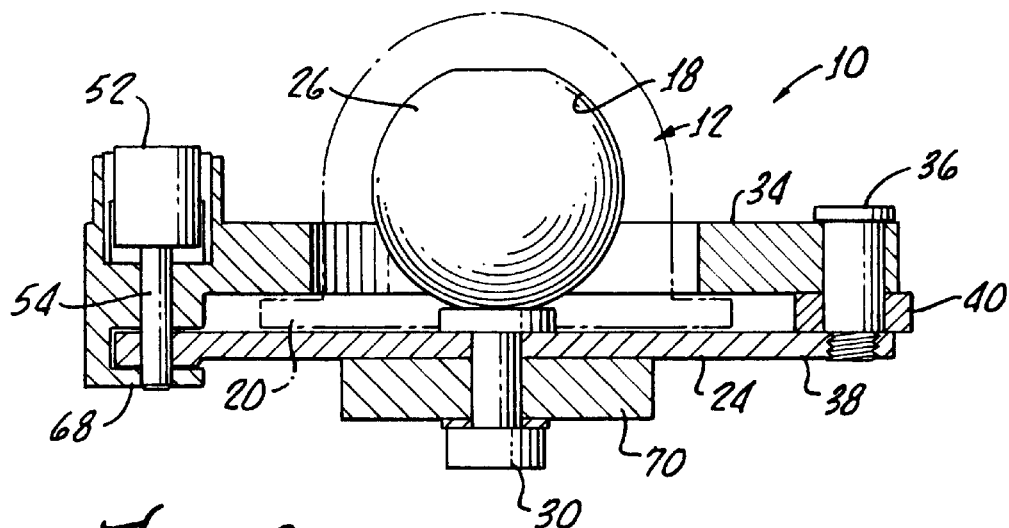
FIG. 3 a cross sectional view taken along the line 3—3 of FIG. 2.
Figure 4:
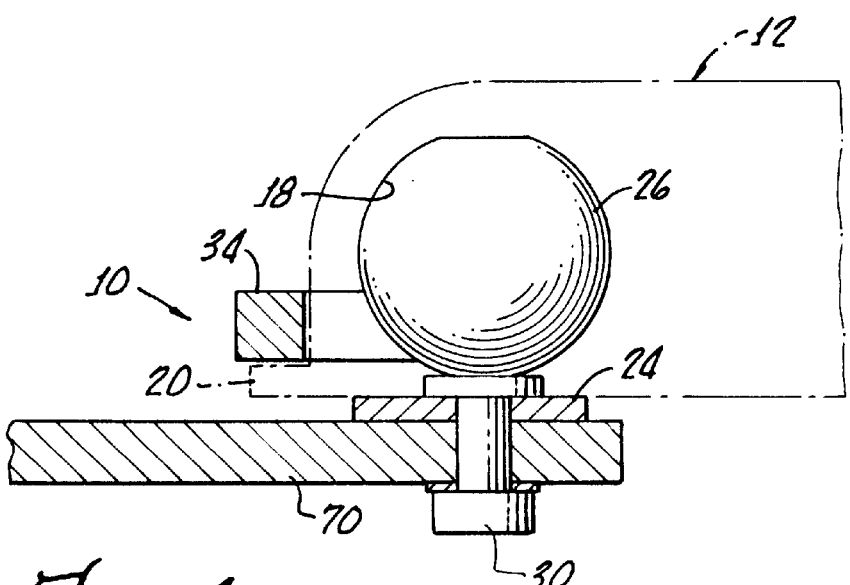
FIG. 4 a cross sectional view of the lock module taken along the line 4—4 of FIG. 2.

The module 10 includes a base 24 and a ball 26 fixed thereto by way of a mounting lug, or pin 30, see FIGS. 3–4.

A locking arm 34 is pivotally attached to the base 24 by means of a hinge pin 36 which threadably engages the base 24 at one end 38 thereof. A spacer 40 enables the locking arm 34 to be pivoted in a plane parallel to the base from an open position as shown in FIG. 1 to a closed position as shown in FIG. 2 (in the direction of arrow 42).

In the closed position, the locking arm 34 which preferably includes an arcuate portion 46 engages the protruding lip 20 which prevents removal of the socket 12 from the ball 26. It should be appreciated that this engagement need not be a tight abutting relationship. That is engagement in the sense intended in the present application means any contact between the lip 20 and the locking arm 34 which prevents removal of the socket 12 from the ball 26. This loose engagement enables the module 10 to be installed on a vehicle (not shown) for locking the trailer tongue 14 thereto.

Figure 2:
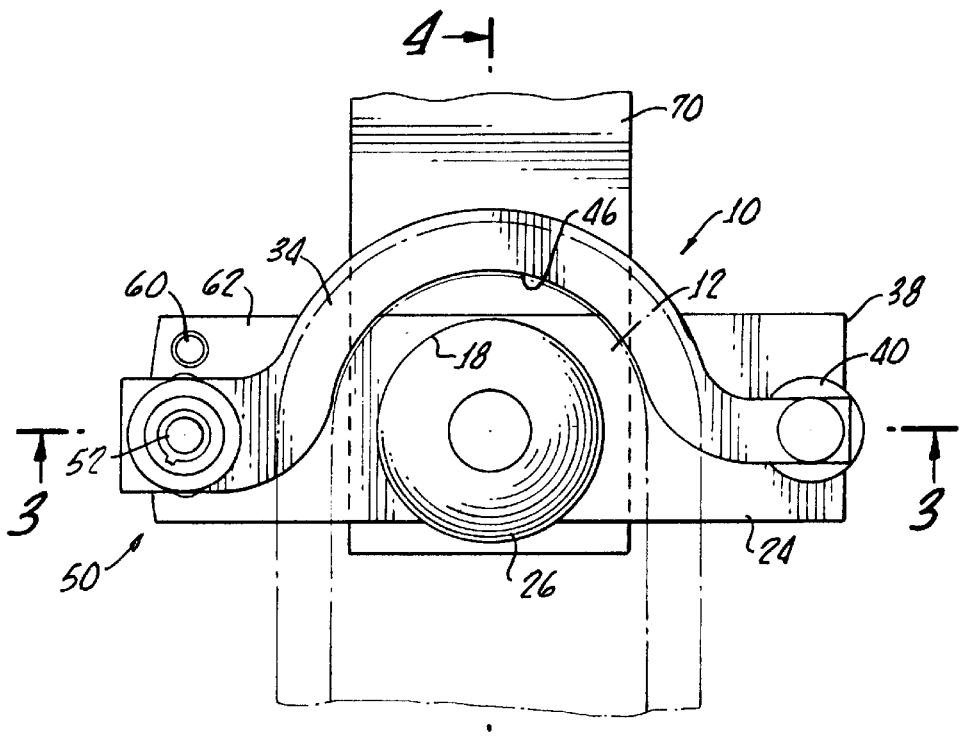
FIG. 2 is a top view of the lock module shown in FIG. 1 with the arm shown in the closed position in circling, or surrounding, the trailer tongue socket.

A lock mechanism 50, which preferably includes a cylinder lock 52 having a removable locking pin 54, and holes 60 in another end 62 of the base 24 are provided for securing the locking arm 34 in a closed, or locked, position as shown in FIG. 2.

The plurality of spaced apart holes 60 provides a means for adjusting the closed position of the locking arm 34 in proper engagement with the lip 20 in order to prevent removal of the module 10 from the socket 12. A U-shaped bracket 66 formed in a locking arm 34 beneath the cylinder lock 52, includes a foot portion 68 for capturing the base end 24, as most clearly shown in FIG. 3, in order to prevent prying of the locking arm 34 from the base 24 when the locking arm 34 is in the locked, or closed position. The locking pin 54 may extend into or through the foot 68 in order to provide a more secure engagement between the locking arm 34 and the base 24.

It should be appreciated that all of the components of the module 10 are formed from appropriate material, such as hardened steel, in order to enhance the overall security of the module 10. It should also be appreciated that module 10 may be used alone in order to prevent unauthorized hitching to the trailer tongue 14 when the trailer (not shown) is unattended. Also, the module 10 may be used on a vehicle (not shown) when attached to a drawbar 70 as shown in the figures. This use of the module 10 may be done whenever the draw bar 70 has sufficient length to enable proper opening of the locking arm 34 in order to permit removal of socket 12 from the ball 26.

Although there has been hereinabove described a particular arrangement of a trailer lock module in accordance with the present invention for the purpose of illustrating the manner in which the invention may be used to advantage, it should be appreciated that the invention is not limited thereto. Accordingly, any and all modification, variations or equivalent arrangements which may occur to those skilled in the art should be considered within the scope of the present invention as defined in the appended claims.

What is claimed is:

1. A trailer hitch lock module for engaging a trailer tongue socket, the socket including a cup and a protruding lip extending outwardly from the socket, said trailer hitch lock module comprising:

a base;

a ball, fixed to said base for engaging the socket cup;

a locking arm, pivotally attached to said base and movable, in a plane parallel to said base, between a closed position engaging said protruding lip in order to prevent removal of said socket from said ball and an open position, away from said lip, in order to enable removal of the socket from said ball; and a lock mechanism for securing said locking arm in the closed position, said lock mechanism including means for adjusting the closed position of said locking arm in order to accommodate different size socket lips.

2. The lock module according to claim 1 wherein said lock mechanism includes a cylinder lock disposed on, and pivoting with, said locking arm.

3. The lock module according to claim 2 wherein the means for adjusting the closed position of the arm includes a plurality of spaced apart holes in said base.

4. The lock module according to claim 3 wherein said cylinder lock includes a pin for engaging one of the plurality of holes in said base.

5. The lock module according to claim 2 wherein said cylinder lock includes a pin and said means for adjusting the closed position of said locking arm includes a plurality of spaced apart holes in said base for engaging said pin.

6. The lock module according to claim 5 wherein said locking arm includes an arcuate cutout for partially surrounding said socket in the closed position.

7. A lock module for providing secured engagement between a trailer and a trailer hitch, said lock module comprising:

a base;

a ball, fixed to said base, for engaging a trailer tongue socket, the socket including a cup for receiving a portion of said ball and a protruding lip extending outwardly from the socket;

a locking arm, pivotally attached to said base at a spaced apart position from said ball and moveable in between a closed position engaging said lip, in order to prevent removal of said socket from said ball, to an open position, away from said lip, in order to enable removal of said socket from said ball; and a lock for securing said locking arm in the closed position, said lock being disposed on, and pivots with said locking arm, said lock further including a pin and means for adjusting the closed position of said locking arm in order to accommodate different size socket lips, the means for adjusting including a plurality of spaced apart holes in said base for engaging said pin.

8. The lock module according to claim 7 wherein said lock includes a pin and said means for adjusting the closed position of said locking arm includes a plurality of spaced apart holes in said base for engaging said pin.

9. The lock module according to claim 7 wherein said locking arm includes an arcuate cutout for partially surrounding said socket in the closed position.

* * * * *